(12) United States Patent
Brooks

(10) Patent No.: US 9,101,129 B2
(45) Date of Patent: Aug. 11, 2015

(54) DECOY CONVERSION ACCESSORIES

(71) Applicant: Phillip Brooks, Dallas, TX (US)

(72) Inventor: Phillip Brooks, Dallas, TX (US)

(*) Notice: Subject to any disclaimer, the term of this patent is extended or adjusted under 35 U.S.C. 154(b) by 149 days.

(21) Appl. No.: 13/776,003

(22) Filed: Feb. 25, 2013

(65) Prior Publication Data

US 2014/0237885 A1 Aug. 28, 2014

(51) Int. Cl.
*A01M 31/06* (2006.01)

(52) U.S. Cl.
CPC ............ *A01M 31/06* (2013.01); *Y10T 29/49826* (2015.01)

(58) Field of Classification Search
CPC .......... A01M 31/06; A63H 3/12; A63H 3/365
USPC ...................... 43/2, 3; 446/321, 337
IPC ........................................................ A01M 31/06
See application file for complete search history.

(56) References Cited

U.S. PATENT DOCUMENTS

| | | | |
|---|---|---|---|
| 547,033 A * | 10/1895 | Ross ................................... | 43/3 |
| 747,732 A | 12/1903 | Kremer | |
| 2,706,357 A * | 4/1955 | Nigh et al. ........................... | 43/3 |
| 3,470,645 A * | 10/1969 | Mattson ............................. | 43/3 |
| 4,318,240 A | 3/1982 | Hillesland | |
| 4,691,464 A | 9/1987 | Rudolph | |
| 5,572,824 A * | 11/1996 | Szolis .................................. | 43/3 |
| 5,595,012 A | 1/1997 | Coleman | |
| 5,809,683 A * | 9/1998 | Solomon ............................. | 43/3 |
| 5,983,552 A * | 11/1999 | Nelson ................................ | 43/2 |
| 6,170,188 B1 * | 1/2001 | Mathews ............................. | 43/3 |
| 6,374,530 B1 | 4/2002 | Mierau | |
| 6,408,559 B2 * | 6/2002 | Mathews ............................. | 43/3 |
| 6,508,028 B1 * | 1/2003 | Crowe ................................. | 43/3 |
| 6,574,903 B2 * | 6/2003 | Solomon ............................. | 43/3 |
| 6,584,721 B1 | 7/2003 | Reule et al. | |
| 6,708,440 B2 * | 3/2004 | Summers et al. .................... | 43/2 |
| 8,087,199 B2 * | 1/2012 | Roe ..................................... | 43/2 |
| 2002/0162268 A1 | 11/2002 | Fulcher | |
| 2003/0061754 A1 * | 4/2003 | Cicoff et al. ....................... | 43/2 |
| 2007/0289193 A1 | 12/2007 | Alexander | |
| 2007/0289194 A1 | 12/2007 | Alexander | |
| 2008/0034639 A1 | 2/2008 | Abbas | |
| 2009/0007479 A1 * | 1/2009 | Jerome, Sr. ........................ | 43/2 |
| 2010/0154283 A1 | 6/2010 | Fischer et al. | |

* cited by examiner

*Primary Examiner* — Kathleen Alker
(74) *Attorney, Agent, or Firm* — Hemingway & Hansen LLP; D. Scott Hemingway

(57) ABSTRACT

A new concept and invention for converting the conventional flying wing decoy into a different species/gender/genome. The system would use a decoy currently on the market and convert the product from the species that it represents to a different species/gender/or genome that the hunter is in pursuit of on that particular hunt. For example, a flying dove decoy can be converted to a duck of several different types, and a flying duck decoy can be converted to a squirrel or other ground dwelling animal. This allows the sportsman to use one single motorized system to create different decoy animals and species.

30 Claims, 5 Drawing Sheets

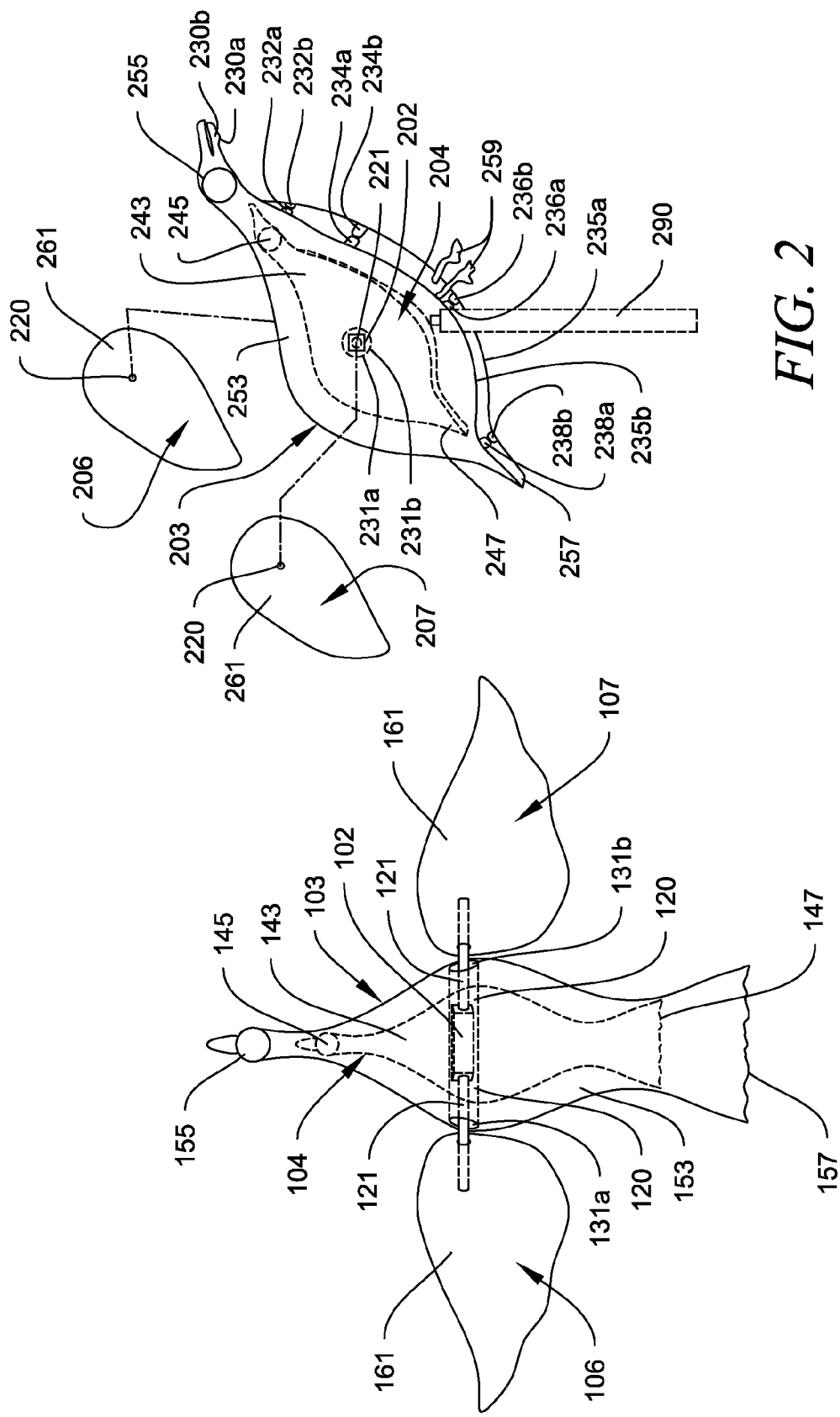

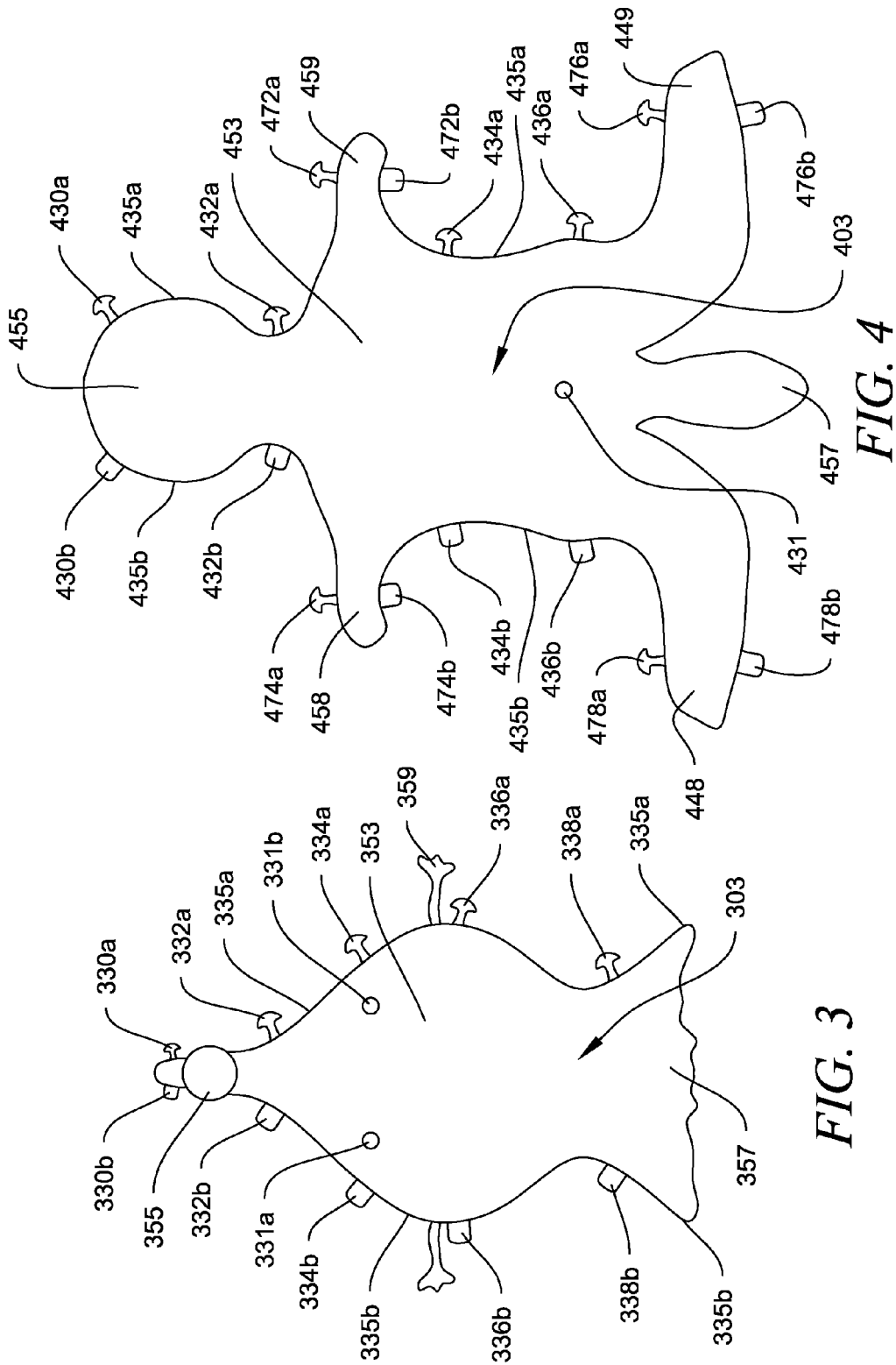

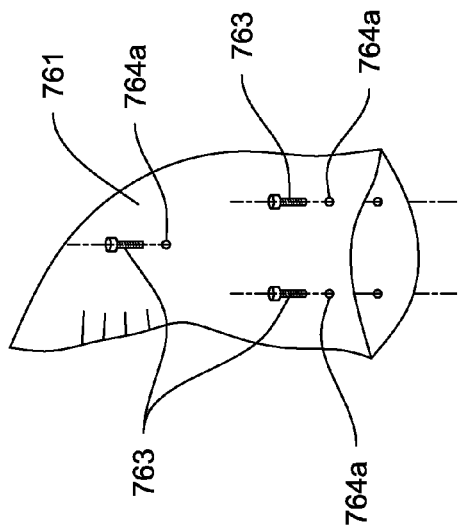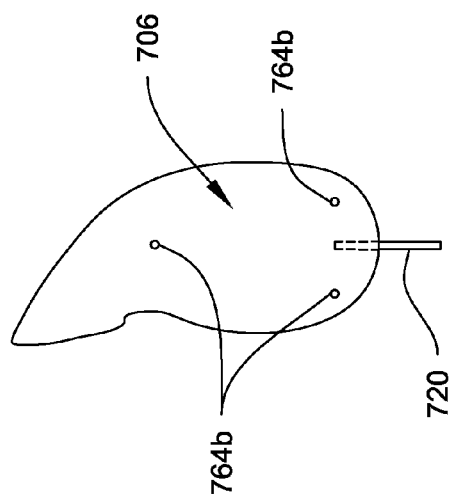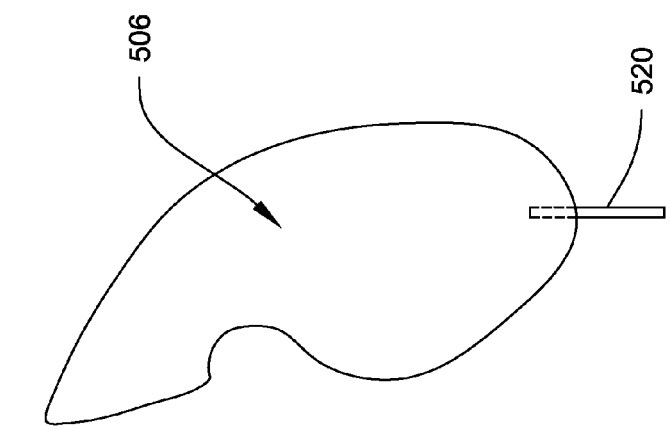

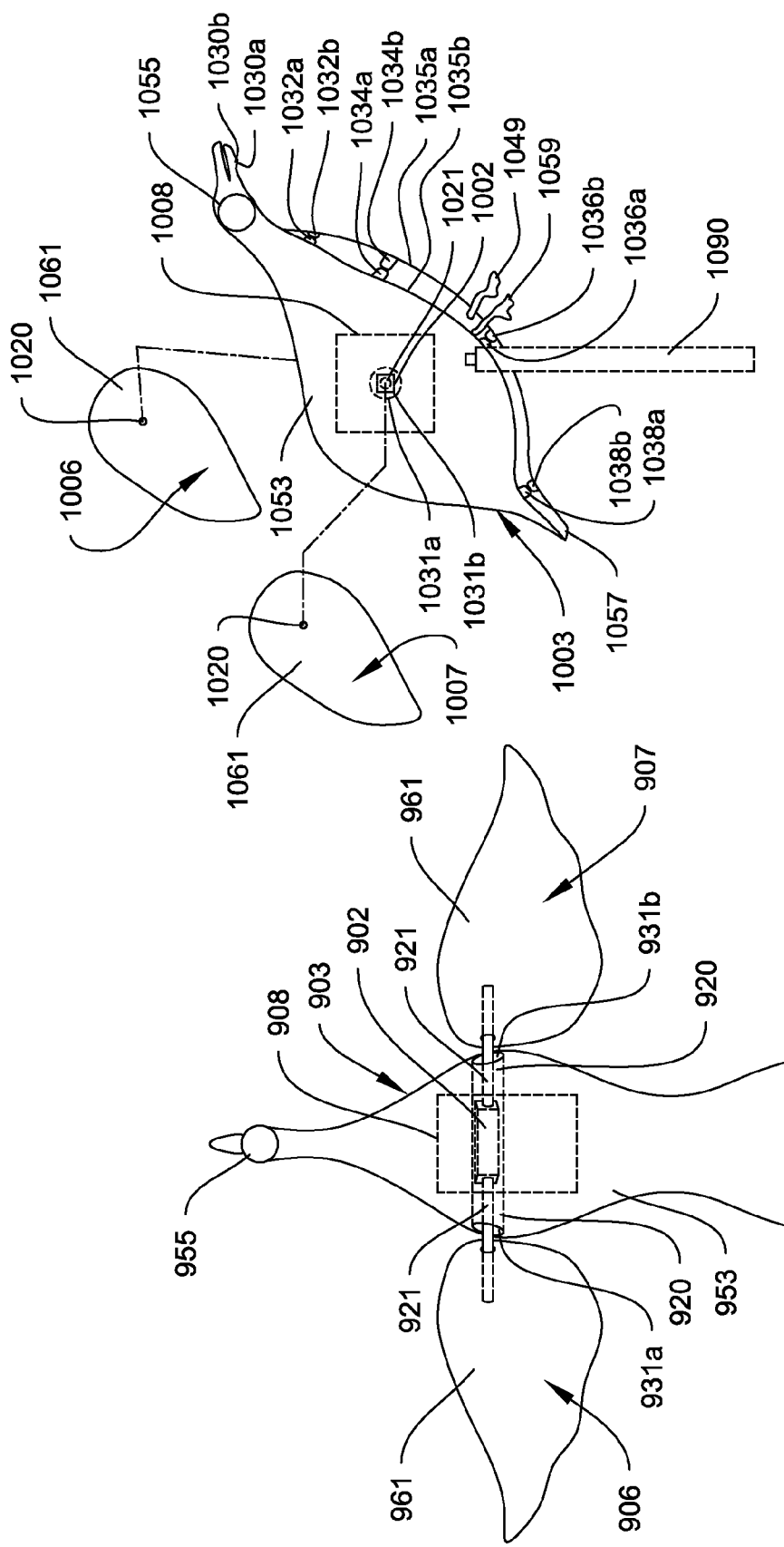

DECOY CONVERSION ACCESSORIES

RELATED APPLICATION DATA

None.

TECHNICAL FIELD OF THE INVENTION

The invention relates to the field of hunting decoys.

BACKGROUND OF THE INVENTION

The invention provides enhanced versatility and cost-effectiveness over current flying duck decoys, dove decoys, and varmint decoys. The present invention allows the imitation of various species of game as well as gender of game. Each one of these decoys facilitates similar drive motors that drive a set of wings or appendages meant to match the species of decoy that is being displayed, mounted or used.

Current decoys that are available today are extremely bulky and the price points of these decoys range by as much as 120% more for a larger species with a similar motor than the smaller species that the same manufacturers offer. The current manufacturers of decoys also only offer a couple of different species of water fowl and varmint and those species of waterfowl and varmint are not always what the hunter is trying to attract.

Research of the prior art returned some results for ways to improve the way a sitting or standing decoy look in the field by either dressing up the decoy or putting the decoy in a different position using the molding or print. For example, one reference shows a duck that can be made to float, stand, or be put in the feeding position by the way the decoy is folded and set up. None of the current applications, however, address changing a decoy body or motorized mechanism into a completely different animal, species or gender nor do any of the current applications address or attempt to modify the moving wing decoy to create several different species or gender of decoys using the same internal motorized components.

SUMMARY OF THE INVENTION

The present invention supports the versatile conversion of the conventional motorized flying wing decoy into different gender, species or genome of decoys while conserving resources such as the internal workings, motors or bare decoy. The invention uses a decoy, bare workings or motor so it can be converted to a different gender, species or genome that the hunter is in pursuit of on that particular hunt. The invention utilizes a cover that is fitted and formed with addition of fasteners and holes so that the cover will fit securely over the owners existing flying decoy, bare workings or motor.

The system also utilizes an appendage/attachment or appendage set that can be attached to the owner's original motorized decoy to match the gender, species or genome that the sportsman is trying to attract or imitate. The cover and attachments would preferably be a flexible water proof plastic printed with photo/graphic design art. In essence, the system can convert a flying dove decoy to a duck of several different types or convert a flying duck decoy to a rabbit or rodent of several different types. This allows the sportsman to use one single motorized system or bare decoy to hunt whatever game he is after without having to purchase several different motorized decoys that cost a lot of money and take up more cargo space. Enhanced versatility and cost effectiveness is achieved by conservation of decoy resources.

BRIEF DESCRIPTION OF THE DRAWINGS

FIG. 1 is a top view of the device applied to a conventional hunting decoy with the conventional decoy shown in phantom.

FIG. 2 is a side view of the device applied to a conventional hunting decoy with the conventional decoy shown in phantom and wing attachments removed.

FIG. 3 illustrates a cover portion of the device.

FIG. 4 illustrates another cover portion of the device.

FIG. 5 illustrates a wing attachment of the device.

FIG. 6 illustrates a tail attachment of the device.

FIG. 7 illustrates an attachment cover and securement of the attachment cover to a wing attachment.

FIG. 9 is a top view of the device applied to a motor unit shown in phantom.

FIG. 10 is a side view of the device applied to a motor unit shown in phantom.

DETAILED DESCRIPTION OF THE PREFERRED EMBODIMENTS

Figure 8:
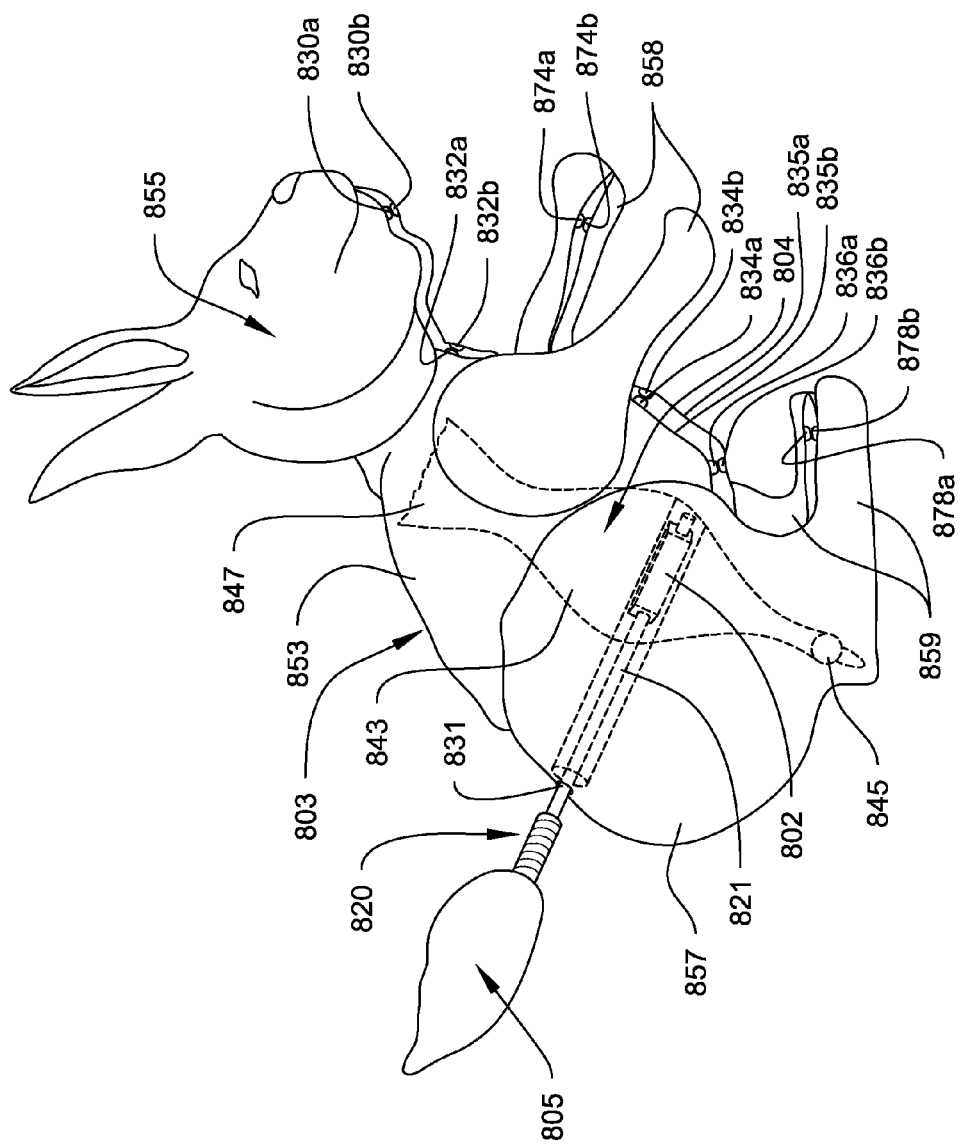
FIG. 8 is a side view of another embodiment of the device applied to a conventional decoy with conventional decoy shown in phantom.

The system of the invention utilizes a single decoy, preferably a small dove decoy, and simply changes the gender, species or genome to a dove, duck, goose or varmint prey by providing a low cost wrap around cover and attachment (e.g. wing or appendage) to simulate the waterfowl game or predator you are after.

This invention has the intent to improve on a product that is currently on the market and make it into a transformable type decoy that can be used for many different types of game using the motor drive from the decoy currently on the market.

A system that improves and/or reconfigures a conventional motorized hunting decoy is disclosed. The system is preferably used like a kit to alter a conventional motorized decoy used for hunting. By altering the original decoy, the user can create various decoys that differ in size, gender, species or genome. This allows the user to use the original decoy and adapt it to the species or game that the user is trying to decoy. The device also provides the user with a cost effective way to hunt various species or game as it keeps the user from having to purchase a decoy for every desired species.

This invention will result in the ability of the sportsman or user to purchase inexpensive covers imitating the game or prey they intend to replicate without having to purchase a motor every time they get a different decoy. They simply need one motorized decoy currently on the market and then wrap it with the art cover and attachments of their choice.

Previously, if the user wanted to hunt dove, duck, and varmint, the user would be required to purchase a separate decoy for each species. Good hunting decoys can cost hundreds of dollars, which can be very hindering to a user that hunts various species of animals. The disclosed invention allows the user to purchase a single motorized decoy and alter it with an inexpensive kit-like system instead of having to purchase multiple expensive decoys, thus one motorized decoy takes the place of 2 or more decoys. The invention is also advantageous as it allows the user to mix and match covers and attachments providing many combinations thereof to create the ideal decoy for that particular hunt.

Because the covers and attachments are smaller and lighter than a decoy of the same, the invention also allows for easier transport of multiple decoy gender, species or genome as the user only has to carry one decoy with one or more covers and attachments compared to carrying two or more decoys or returning to base camp every time the user wants to exchange the decoy being used. This is also advantageous in providing the user the ability to change the decoy when desired, wherever desired.

For example, if a user wanted to go duck hunting and only had a motorized dove decoy, the user would take the motorized dove decoy and modify it with a duck cover and duck wing attachments that the invention provides. In addition, if the user wanted to go dove and duck hunting, he/she could use the single decoy and modify the decoy as desired while out in the field and not have to carry around two separate decoys.

The device has a cover portion that is adapted to wrap the original decoy in a predesigned cover and/or alter the body of the original decoy. The device also utilizes the motor of the original decoy and employs various attachments to the motor for life-like movement of the newly created size, gender, species or genome.

Referring to FIG. 1, a top view of an embodiment of the disclosed device is shown applied to a conventional motorized hunting decoy. Most conventional motorized hunting decoys comprise a body 104 having a decoy head 145, decoy middle 143 and decoy tail 147, a motor 102 within the decoy middle 143, and attachments that are connected to the motor 102. The motor 102 can be battery powered, wind powered or other forms of motorized units used in conventional decoys. Before implementing the device, the original attachments on the decoy need to be removed by disconnecting them from the motor. The device comprises a cover portion 103, wing attachments 106 and 107 and attachment covers 161.

The cover portion 103 has a cover head 155, cover middle 153 and a cover tail 157. The cover portion 103, having a decorated outer surface and a non-decorated inner surface, is attached to the decoy body 104 by substantially wrapping the cover portion 103 around the decoy body 104 with the decorated outer surface of cover portion 103 facing away from the decoy body 104. When wrapping the cover portion 103 around decoy body 104, the cover head 155 is approximate the decoy head 145, the cover middle 153 is approximate the decoy middle 143 and cover tail 157 is approximate decoy tail 147 to provide a better fit.

Cover portion 103 comprises fasteners (best illustrated in FIG. 3) that are used to secure to corresponding fasteners on cover portion 103, which when fastened, keep cover portion 103 secured and wrapped around decoy body 104. Various fastener types may be used, for example, hooks, buttons, clasps, VELCRO® hook/loop straps or other mechanisms that provide a way for the cover to be removably secured to the decoy body.

By substantially covering the existing decoy body, the original decoy takes on a new appearance of the animal the user desires to attract or decoy. This allows the original decoy body to purpose as various decoys and not only the decoy for which it was designed. For example, the decoy may be a dove decoy with the covers and attachments modifying the dove decoy to resemble a duck or goose.

Wing attachments 106 and 107 comprise an attachment connector 120 and are adapted to secure to a motor connector 121 on motor 102. The cover portion 103 further defines attachment holes 131a and 131b that are specifically located to allow the attachment connector 120 of wing attachments 106 and 107 to insert through attachment holes 131a and 131b of cover portion 103 and be secured to motor 102.

To employ the attachments, an attachment connector 120 of wing attachment 106 is inserted through hole 131a in the cover portion and secured to the motor connector 121 on the motor 102 of the original decoy. The previous step is repeated for the other wing attachment 107, inserting the attachment connector 120 through hole 131b and securing it to another motor connector 121 on the motor 102 of the original decoy. The cover portion 103 may need to be adjusted prior to applying the wing attachments 106 and 107 to make sure attachment holes 131a and 131b are aligned with the motor connectors 121.

Motor connector 121 engages the attachment connector 120 to secure the wing attachment 106 and 107 to motor 102. The attachment connector and motor connector may be a nut and bolt combination, magnets, a screw-insert combination, a snap or any other form of connector that maintains the attachment secured to the motor.

Wing attachments 106 and 107 may further comprise an attachment cover 161. The attachment cover is secured to the wing attachments 106 and 107 by way of fasteners, tie strings or other forms known in the art that keep the attachment cover 161 from being accidentally removed.

Alternatively, the attachment cover may be fabricated to be permanently secured to the wing attachment (e.g. form molding or adhesive) or may be integrally fabricated with the wing attachment (i.e. a single structure) and provided to the user as various pre-prepared attachments. This may be more beneficial to those who find it easier to exchange the whole attachment than just the attachment cover.

Cover portion 103 may also define a gap between fasteners that allows a support pole or stake (not shown, see FIG. 2) to be secured to the decoy body for stability. The support pole or stake is commonly found in the decoy market to provide the decoy with stability, height off the ground and/or an anchor to the ground.

By employing different cover portions and/or wing attachments, the user can better match the particular bird desired to be hunted or decoyed and can be done quickly and easily on the spot. The cover portion material is preferably made of a bendable plastic, waterproof material or waterproofed material that can withstand outdoor elements. Other materials may be used like wood, foam, composites and the like as long as the material can withstand outdoor elements.

Referring to FIG. 2, a side view of an embodiment of the disclosed device is shown applied to a conventional motorized hunting decoy with wing attachments exploded out. Most conventional motorized hunting decoys comprise a body 204 having a decoy head 245, a decoy middle 243 and decoy tail 247, a motor 202, and attachments that are connected to the motor 202.

The motor 202 can be battery powered, wind powered or other forms of motorized units used in conventional decoys. Before implementing the device, the original attachments on the decoy need to be removed by disconnecting them from the motor. The device comprises a cover portion 203, wing attachments 206 and 207 and attachment covers 261.

The cover portion 203 has a cover head 255, a cover middle 253, a cover tail 257 and cover feet 259. The cover portion 203, having a decorated outer surface and a non-decorated inner surface, is attached to the decoy body 204 by substantially wrapping the cover portion 203 around the decoy body 204 with the decorated outer surface of the cover portion 203 facing away from the decoy body 204. When wrapping the cover portion 203 around decoy body 204, the cover head 255 is approximate the decoy head 245, the cover middle 253 is approximate the decoy middle 243 and cover tail 257 is approximate decoy tail 247 to provide a better fit. Cover feet 249 reside along the bottom of the covered decoy when the covered decoy is in an upright position.

Cover portion 203 comprises various fasteners along a first edge 235a (230a, 232a, 234a, 236a and 238a) and a second edge 235*b* (230*b*, 232*b*, 234*b*, 236*b* and 238*b*). Fasteners 230*a* and 230*b* secure to one another to keep the cover head 255 in place around decoy head 245. Fasteners 232*a*, 234*a* and 236*a* secure to fasteners 232*b*, 234*b* and 236*b* to keep the cover middle 253 in place around decoy middle 243. Fasteners 238*a* and 238*b* secure to one another to keep the cover tail 257 in place around decoy tail 247. Various fastener types may be used, for example, hooks, buttons, clasps, VELCRO® hook/loop straps or other mechanisms that provide a way for the cover to be removably secured to the decoy body.

By substantially covering the existing decoy body, the original decoy takes on a new appearance of the animal the user desires to attract or decoy. This allows the original decoy body to purpose as various decoys and not only the decoy for which it was designed. For example, the decoy may be a dove decoy with the covers and attachments modifying the dove decoy to resemble a duck or goose.

Wing attachments 206 and 207 comprise an attachment connector 220 and are adapted to secure to a motor connector 221 on motor 202. The cover portion 203 further defines attachment holes 231*a* and 231*b* that are specifically located to allow the attachment connector 220 of wing attachments 206 and 207 to insert through attachment holes 231*a* and 231*b* of cover portion 203 and be secured to motor 202.

To employ the attachments, an attachment connector 220 of wing attachment 206 is inserted through hole 231*a* (not shown) in the cover portion and secured to the motor connector 221 on the motor 202 of the original decoy. The previous step is repeated for the other wing attachment 207, inserting the attachment connector 220 through hole 231*b* and securing it to another motor connector 221 on the motor 202 of the original decoy. The cover portion 203 may need to be adjusted prior to applying the wing attachments 206 and 207 to make sure attachment holes 231*a* and 231*b* are aligned with the motor connectors 221.

Cover portion 203 also defines a gap between fastener combinations 234*a*-234*b* and 236*a*-236*b* that allows a support pole or stake 290 to be secured to the decoy body 204 for stability. The support pole or stake is commonly found in the decoy market to provide the decoy with stability, height off the ground and/or an anchor to the ground.

By employing different cover portions and/or wing attachments, the user can better match the particular bird desired to be hunted or decoyed and can be done quickly and easily on the spot. The cover portion material is preferably made of a bendable plastic, waterproof material or waterproofed material that can withstand outdoor elements. Other materials may be used like wood, foam, composites and the like as long as the material can withstand outdoor elements.

FIGS. 3 and 4 illustrate examples of the cover portion. FIG. 3 shows a bird cover portion. Cover portion 303, having a first edge 335*a* from the head area to the tail area along the right side of the cover portion 303 and a second edge 335*b* from the head area to the tail area along the left side of the cover portion 303, comprises the anatomical appearance of a bird including body, head, tail and feet. Both the first edge 335*a* and the second edge 335*b* comprise fasteners. Cover portion 303 comprises various fasteners along the first edge 335*a* (330*a*, 332*a*, 334*a*, 336*a* and 338*a*) and a second edge 335*b* (330*b*, 332*b*, 334*b*, 336*b* and 338*b*).

The cover portion 303 has a cover head 355, a cover middle 353, a cover tail 357 and cover feet 359. The cover portion 303, having a decorated outer surface and a non-decorated inner surface, is attached to the decoy body 304 by substantially wrapping the cover portion 303 around a decoy body with the decorated outer surface of the cover portion 303 facing away from the decoy body. When wrapping the cover portion 303 around the decoy body, the cover head 355 is approximate a decoy head, the cover middle 353 is approximate a decoy middle and cover tail 357 is approximate a decoy tail to provide a better fit. Cover feet 349 reside along the bottom of the covered decoy when the covered decoy is in an upright position.

Fasteners 330*a* and 330*b* secure to one another to keep the cover head 355 in place around a decoy head. Fasteners 332*a*, 334*a* and 336*a* secure to fasteners 332*b*, 334*b* and 336*b* to keep the cover middle 353 in place around a decoy middle. Fasteners 338*a* and 338*b* secure to one another to keep the cover tail 357 in place around a decoy tail. Various fastener types may be used, for example, hooks, buttons, clasps, VELCRO® hook/loop straps or other mechanisms that provide a way for the cover to be removably secured to the decoy body.

By substantially covering the existing decoy body, the original decoy takes on a new appearance of the animal the user desires to attract or decoy. This allows the original decoy body to purpose as various decoys and not only the decoy for which it was designed. For example, the decoy may be a dove decoy with the covers and attachments modifying the dove decoy to resemble a duck or goose.

The cover portion 303 further defines attachment holes 331*a* and 331*b* that are specifically located to allow the attachment of the wing attachments (not shown) to the motor (not shown) of the decoy. The cover portion 303 may need to be adjusted to make sure attachment holes 331*a* and 331*b* are aligned with the motor connectors of the motor.

By employing different cover portions and/or wing attachments, the user can better match the particular bird desired to be hunted or decoyed and can be done quickly and easily on the spot.

FIG. 4 shows a cover portion for a small animal like a rabbit or rodent. Cover portion 403, having a first edge 435*a* from the head area to the tail area along the right side of the cover portion 403 and a second edge 435*b* from the head area to the tail area along the left side of the cover portion 403, comprises the anatomical appearance of a varmint including body, head, tail and feet. Both the first edge 435*a* and the second edge 435*b* comprise fasteners. Cover portion 403 comprises various fasteners along the first edge 435*a* (430*a*, 432*a*, 434*a*, 436*a*, 472*a* and *b*, and 476*a* and *b*) and a second edge 435*b* (430*b*, 432*b*, 434*b*, 436*b*, 474*a* and *b*, and 478*a* and *b*).

The cover portion 403 has a cover head 455, a cover middle 453, a cover tail 457, cover front feet 458 and cover rear feet 448 and 449. The cover portion 403, having a decorated outer surface and a non-decorated inner surface, is attached to the decoy body by substantially wrapping the cover portion 403 around a decoy body with the decorated outer surface of the cover portion 403 facing away from the decoy body. When wrapping the cover portion 403 around a decoy body, the cover head 455 is approximate the decoy tail, the cover middle 453 is approximate a decoy middle and cover tail 457 is approximate a decoy head to provide a better fit and place the motor near the back of the cover portion 403 to allow for application of tail attachment. Rear cover feet 448 and 449 reside along the bottom of the covered decoy when the covered decoy is in an upright position.

Fasteners 430*a* and 430*b* secure to one another to keep the cover head 455 in place around a decoy tail. Fasteners 432*a*, 434*a* and 436*a* secure to fasteners 432*b*, 434*b* and 436*b* to keep the cover middle 453 in place around a decoy middle. Fasteners 474*a* and 474*b* secure to one another and fasteners 472*a* and 472*b* secure to one another to keep the cover in place around cover front feet 448 and 449. Fasteners 478*a* and 478*b* secure to one another and fasteners 476*a* and 476*b* secure to one another to keep the cover in place around cover rear feet 458 and 459. Various fastener types may be used, for example, hooks, buttons, clasps, VELCRO® hook/loop straps or other mechanisms that provide a way for the cover to be removably secured to the decoy body.

By substantially covering the existing decoy body, the original decoy takes on a new appearance of the animal the user desires to attract or decoy. This allows the original decoy body to purpose as various decoys and not only the decoy for which it was designed. For example, the decoy may be a dove decoy with the covers and attachments modifying the dove decoy to resemble a duck or goose.

The cover portion 403 further defines an attachment hole 431 that is specifically located to allow the attachment of the tail attachment (not shown) to the motor (not shown) of the decoy. The cover portion 403 may need to be adjusted to make sure attachment hole 431 is aligned with the motor connector of the motor.

By employing different cover portions and/or wing attachments, the user can better match the particular bird desired to be hunted or decoyed and can be done quickly and easily on the spot.

FIG. 5 illustrates a wing attachment 506 of the device. The wing attachment 506 comprises an attachment connector 520 extending out from an edge of the wing attachment 506. To employ the attachment of the invention, the user will first need to remove the initial wing attachments of the original motorized decoy. A cover portion is then applied to the decoy body by wrapping the cover portion substantially around a decoy body, as described in FIG. 1.

Attachment connector 520 is adapted to engage a motor connector of motor and secure the wing attachment 506 to the motor. The attachment connector 520 of wing attachment 506 is inserted through a hole defined by the cover portion approximate a motor connector and secured to the motor connector on the motor of the original decoy. The previous step is repeated for the other wing attachment (not shown, but is a mirror image of wing attachment 506), inserting the attachment connector through another hole defined by the cover portion approximate a motor connector and securing it to the motor connector on the motor of the original decoy. The cover portion may need to be adjusted to make sure the defined holes are aligned with the motor connectors.

Motor connector engages the attachment connector 520 to secure the wing attachment 506 to the motor. The attachment connector and motor connector may be a nut and bolt combination, magnets, a screw-insert combination, a snap or any other form of connector that maintains the attachment secured to the motor.

By employing different cover portions and/or wing attachments, the user can better match the particular bird desired to be hunted or decoyed and can be done quickly and easily on the spot.

FIG. 6 illustrates a tail attachment 605 of the device. The tail attachment 605 comprises an attachment connector 620 extending out from an edge of the tail attachment 605. To employ the attachment of the invention, the user will first need to remove the initial tail attachment of the original motorized decoy. A cover portion is then applied to the decoy body by wrapping the cover portion substantially around the decoy body, as described in FIG. 8.

Attachment connector 620 is adapted to engage a motor connector of a motor and secure the tail attachment 605 to the motor. The attachment connector 620 of tail attachment 605 is inserted through a hole defined by the cover portion approximate a motor connector and secured to the motor of the original decoy. The motor comprises a motor connector that engages the attachment connector 620 to secure the tail attachment 605 to the motor. The cover portion may need to be adjusted to make sure the defined hole is aligned with the motor connector.

By employing different cover portions and/or tail attachments, the user can better match the particular animal desired to be hunted or decoyed and can be done quickly and easily on the spot.

Tail attachment 605 is preferably a structure covered by real or faux fur to be perceived as a real tail. Alternatively, tail attachment 605 may comprise a spring (illustrated in FIG. 8) to provide an erratic movement of the tail.

Referring to FIG. 7, a method of using an attachment cover 761 and attaching the attachment cover 761 to a wing attachment 706 is shown. Wing attachment 706 defines one or more fastener holes 764b that are adapted to engage attachment cover fasteners 763. Attachment cover 761 defines one or more fastener holes 764a that are positioned on the attachment cover 761 to align with the fastener holes 764b of wing attachment 706 after attachment cover 761 has been placed around the wing attachment 706.

Attachment cover fasteners 763 are inserted through the fastener holes 764a and connect to the fastener holes 764b and secure the attachment cover 761 to wing attachment 706. Various fastener types may be used, for example, hooks, buttons, clasps, VELCRO® hook/loop straps or other mechanisms that provide a way for the cover to be removably secured to the motor unit.

Alternatively, the attachment cover may be fabricated to be permanently secured to the wing attachment (e.g. form molding or adhesive) or may be integrally fabricated with the wing attachment (i.e. a single structure) and provided to the user as various pre-prepared attachments. This may be more beneficial to those who find it easier to exchange the whole attachment than just the attachment cover.

To employ the attachment of the invention, the user will first need to remove the initial wing attachments of the original motorized decoy. A cover portion is then applied to the decoy body by wrapping the cover portion substantially around the decoy body, as described in FIG. 1. An attachment connector 720, which extends out from an edge of the wing attachment 706 is adapted to engage a motor connector of motor and secure the wing attachment 706 to the motor.

The attachment connector 720 of wing attachment 706 is inserted through a hole defined by the cover portion approximate a motor connector and secured to the motor connector on the motor of the original decoy. The previous step is repeated for the other wing attachment (not shown, but is a mirror image of wing attachment 706), inserting the attachment connector through another hole defined by the cover portion approximate a motor connector and securing it to the motor connector on the motor of the original decoy. The cover portion may need to be adjusted to make sure the defined holes are aligned with the motor connectors.

By employing different cover portions, attachments and/or attachment covers, the user can better match the particular animal desired to be hunted or decoyed and can be done quickly and easily on the spot.

FIG. 8 illustrates the side view of an alternate embodiment of the device. In FIG. 8, a cover portion resembling a small animal or varmint is shown modifying a conventional motorized hunting decoy. Most conventional motorized hunting decoys comprise a body 804 having a decoy head 845, a decoy middle 843 and decoy tail 847, a motor 802, and attachments that are connected to the motor 802. The motor 802 can be battery powered, wind powered or other forms of motorized units used in conventional decoys. Before implementing the device, the original attachments on the decoy need to be removed by disconnecting them from the motor. The device comprises a cover portion 803 and tail attachment 805.

The cover portion 803 has a cover head 855, a cover middle 853, a cover rear 857, cover front feet 858 and cover rear feet 859. The cover portion 803, having a decorated outer surface and a non-decorated inner surface, is attached to the decoy body 804 by substantially wrapping the cover portion 803 around the decoy body 804 with the decorated outer surface of the cover portion 803 facing away from the decoy body 804.

When wrapping the cover portion 803 around decoy body 804, the cover head 855 is approximate the decoy tail 847, the cover middle 853 is approximate the decoy middle 843 and cover tail 857 is approximate decoy head 845 to provide a better fit and place the motor 802 near the back of the cover portion 803 to allow for application of tail attachment 805. Front and rear cover feet 848 and 849 reside along the bottom of the covered decoy when the covered decoy is in an upright position.

Cover portion 803 comprises various fasteners along the first edge 835*a* (830*a*, 832*a*, 834*a*, and 836*a*) and a second edge 835*b* (830*b*, 832*b*, 834*b*, 836*b*, 874*a* and *b*, and 878*a* and *b*). Fasteners 830*a* and 830*b* secure to one another to keep the cover head 855 in place around decoy tail 845. Fasteners 832*a*, 834*a* and 836*a* secure to fasteners 832*b*, 834*b* and 836*b* to keep the cover middle 853 in place around decoy middle 843.

Fasteners 874*a* and 874*b* secure to one another to keep the cover in place around cover front foot 858. Other fasteners secure to one another to keep the cover in place around the other cover front foot 858. Fasteners 878*a* and 878*b* secure to one another to keep the cover in place around cover rear feet 859. Other fasteners secure to one another to keep the cover in place around the other cover rear foot 859. Various fastener types may be used, for example, hooks, buttons, clasps, VELCRO® hook/loop straps or other mechanisms that provide a way for the cover to be removably secured to the decoy body.

By substantially covering the existing decoy body, the original decoy takes on a new appearance of the animal the user desires to attract or decoy. This allows the original decoy body to purpose as various decoys and not only the decoy for which it was designed. For example, the decoy may be a dove decoy with the covers and attachments modifying the dove decoy to resemble a rabbit or rodent.

Tail attachment 805 comprises an attachment connector 820 and is adapted to secure to a motor connector 821 on motor 802. The cover portion 803 further defines attachment hole 831 that is specifically located to allow the attachment connector 820 of tail attachment 805 to insert through attachment hole 831 of cover portion 803 and be secured to motor 802. Motor 802 comprises a motor connector 821 that engages the attachment connector 820 to secure the tail attachment 805 to motor 802.

To employ the attachment, the attachment connector 820 of tail attachment 805 is inserted through hole 831 in the cover portion and secured to the motor connector 821 on the motor 802 of the original decoy. The cover portion 803 may need to be adjusted to make sure attachment hole 831 is aligned with the motor connector 821.

Motor connector 821 engages the attachment connector 820 to secure the tail attachment 805 to motor 2. The attachment connector and motor connector may be a nut and bolt combination, magnets, a screw-insert combination, a snap or any other form of connector that maintains the attachment secured to the motor.

Cover portion 803 may also define a gap between fasteners combinations 834*a*-834*b* and 836*a*-836*b* that allow a support pole or stake (not shown, see FIG. 2) to be secured to the decoy body for stability. Cover portion 803 may be adapted to receive and secure to the support pole or stake because of the altered orientation of the decoy body 804. The support pole or stake is commonly found in the decoy market to provide the decoy with stability, height off the ground and/or an anchor to the ground.

By employing different cover portions and/or tail attachments, the user can better match the particular animal desired to be hunted or decoyed and can be done quickly and easily on the spot. By employing different cover portions and/or tail attachments, the user can better match the particular varmint desired to be hunted or decoyed and can be done quickly and easily on the spot. The cover portion material is preferably made of a bendable plastic, waterproof material or waterproofed material that can withstand outdoor elements. Other materials may be used like wood, foam, composites and the like as long as the material can withstand outdoor elements.

Referring to FIG. 9, a top view of an embodiment of the disclosed device is shown applied to a motorized unit. The motor unit 908 comprises a motor 902. Motor 902 can be battery powered, wind powered or other forms of motorized units used in conventional decoys. Before implementing the device, the original attachments on the decoy need to be removed by disconnecting them from the motor. The device comprises a cover portion 903, wing attachments 906 and 907 and attachment covers 961.

The cover portion 903 has a cover head 955, cover middle 953 and a cover tail 957. The cover portion 903, having a decorated outer surface and a non-decorated inner surface, is attached to the motor unit 908 by substantially wrapping the cover portion 903 around the motor unit 908 with the decorated outer surface of cover portion 903 facing away from the motor unit 908. The motor unit 908 rests within the cover middle 953. Motor unit 908 is positioned within cover middle 953 so that the motor 902 lies along the lateral width of the cover portion 903 to allow for wing attachments 906 and 907 to be secured to the motor 902.

Cover portion 903 comprises fasteners (best illustrated in FIG. 3) that are used to secure to corresponding fasteners on cover portion 903, which when fastened, keep cover portion 903 secured and wrapped around motor unit 908. Various fastener types may be used, for example, hooks, buttons, clasps, VELCRO® hook/loop straps or other mechanisms that provide a way for the cover to be removably secured to the motor unit.

By substantially covering the existing motor unit, the original decoy takes on a new appearance of the animal the user desires to attract or decoy. This allows the original motor unit to purpose as various decoys. For example, the motor unit that is modified with the covers and attachments of the invention to resemble a dove, duck or goose.

Wing attachments 906 and 907 comprise an attachment connector 920 and are adapted to secure to a motor connector 921 on motor 902. The cover portion 903 further defines attachment holes 931*a* and 931*b* that are specifically located to allow the attachment connector 920 of wing attachments 906 and 907 to insert through attachment holes 931*a* and 931*b* of cover portion 903 and be secured to motor 902.

To employ the attachments, an attachment connector 920 of wing attachment 906 is inserted through hole 931*a* in the cover portion and secured to the motor connector 921 on the motor 902 of the original decoy. The previous step is repeated for the other wing attachment 907, inserting the attachment connector 920 through hole 931*b* and securing it to another motor connector 921 on the motor 902 of the original decoy. The cover portion 903 may need to be adjusted prior to applying the wing attachments 906 and 907 to make sure attachment holes 931*a* and 931*b* are aligned with the motor connectors 921.

Motor connector 921 engages the attachment connector 920 to secure the wing attachment 906 and 907 to motor 902. The attachment connector and motor connector may be a nut and bolt combination, magnets, a screw-insert combination, a snap or any other form of connector that maintains the attachment secured to the motor.

Wing attachments 906 and 907 may further comprise an attachment cover 961. The attachment cover is secured to the wing attachments 906 and 907 by way of fasteners, tie strings or other forms known in the art that keep the attachment cover 961 from being accidentally removed.

Alternatively, the attachment cover may be fabricated to be permanently secured to the wing attachment (e.g. form molding or adhesive) or may be integrally fabricated with the wing attachment (i.e. a single structure) and provided to the user as various pre-prepared attachments. This may be more beneficial to those who find it easier to exchange the whole attachment than just the attachment cover.

Cover portion 903 may also define a gap between fasteners that allows a support pole or stake (not shown, see FIG. 10) to be secured to the motor unit for stability. The support pole or stake is commonly found in the decoy market to provide the decoy with stability, height off the ground and/or an anchor to the ground. The motor unit 908 would be adapted to receive and be secured to the support pole.

By employing different cover portions and/or wing attachments, the user can better match the particular bird desired to be hunted or decoyed and can be done quickly and easily on the spot. The cover portion material is preferably made of a bendable plastic, waterproof material or waterproofed material that can withstand outdoor elements. Other materials may be used like wood, foam, composites and the like as long as the material can withstand outdoor elements.

Referring to FIG. 10, a side view of an embodiment of the disclosed device is shown applied to a motor unit with wing attachments exploded out. The motor unit 1008 comprises a motor 1002. The motor 1002 can be battery powered, wind powered or other forms of motorized units used in conventional decoys. Before implementing the device, the original attachments on the decoy need to be removed by disconnecting them from the motor. The device comprises a cover portion 1003, wing attachments 1006 and 1007 and attachment covers 1061.

The cover portion 1003 has a cover head 1055, a cover middle 1053, a cover tail 1057 and cover feet 1049 and 1059. The cover portion 1003, having a decorated outer surface and a non-decorated inner surface, is attached to the motor unit 1008 by substantially wrapping the cover portion 1003 around the motor unit 1008 with the decorated outer surface of the cover portion 1003 facing away from the motor unit 1008. The motor unit 1008 rests within the cover middle 1053. Motor unit 1008 is positioned within cover middle 1053 so that the motor 1002 lies along the lateral width of the cover portion 1003 to allow for wing attachments 1006 and 1007 to be secured to the motor 1002. Cover feet 1049 and 1059 reside along the bottom of the covered motor unit when the covered motor unit is in an upright position.

Cover portion 1003 comprises various fasteners along a first edge 1035*a* (1030*a*, 1032*a*, 1034*a*, 1036*a* and 1038*a*) and a second edge 1035*b* (1030*b*, 1032*b*, 1034*b*, 1036*b* and 1038*b*). Fasteners along the first edge 1035*a* secure to their counterpart fastener along the second edge 1035*b* (i.e. fasteners 1030*a* and 1030*b* secure to one another, fasteners 1032*a* and 1032*b* secure to one another, fasteners 1034*a* and 1034*b* secure to one another, fasteners 1036*a* and 1036*b* secure to one another and fasteners 1038*a* and 1038*b* secure to one another).

When fastened, cover portion 1003 is kept securely wrapped around motor unit 1008. Various fastener types may be used, for example, hooks, buttons, clasps, VELCRO® hook/loop straps or other mechanisms that provide a way for the cover to be removably secured to the motor unit.

By substantially covering the existing motor unit, the original decoy takes on a new appearance of the animal the user desires to attract or decoy. This allows the original motor unit to purpose as various decoys. For example, the motor unit that is modified with the covers and attachments of the invention to resemble a dove, duck or goose.

Wing attachments 1006 and 1007 comprise an attachment connector 1020 and are adapted to secure to a motor connector 1021 on motor 1002. The cover portion 1003 further defines attachment holes 1031*a* and 1031*b* that are specifically located to allow the attachment connector 1020 of wing attachments 1006 and 1007 to insert through attachment holes 1031*a* and 1031*b* of cover portion 1003 and be secured to motor 1002.

To employ the attachments, an attachment connector 1020 of wing attachment 1006 is inserted through hole 1031*a* (not shown) in the cover portion and secured to the motor connector 1021 on the motor 1002 of the original decoy. The previous step is repeated for the other wing attachment 1007, inserting the attachment connector 1020 through hole 1031*b* and securing it to another motor connector 1021 on the motor 1002 of the original decoy. The cover portion 1003 may need to be adjusted prior to applying the wing attachments 1006 and 1007 to make sure attachment holes 1031*a* and 1031*b* are aligned with the motor connectors 1021.

Motor connector 1021 engages the attachment connector 1020 to secure the wing attachment 1006 and 1007 to motor 1002. The attachment connector and motor connector may be a nut and bolt combination, magnets, a screw-insert combination, a snap or any other form of connector that maintains the attachment secured to the motor.

Wing attachments 1006 and 1007 may further comprise an attachment cover 1061. The attachment cover is secured to the wing attachments 1006 and 1007 by way of fasteners, tie strings or other forms known in the art that keep the attachment cover 1061 from being accidentally removed.

Alternatively, the attachment cover may be fabricated to be permanently secured to the wing attachment (e.g. form molding or adhesive) or may be integrally fabricated with the wing attachment (i.e. a single structure) and provided to the user as various pre-prepared attachments. This may be more beneficial to those who find it easier to exchange the whole attachment than just the attachment cover.

Cover portion 1003 also defines a gap between fastener combinations 1034*a*-1034*b* and 1036*a*-1036*b* that allows a support pole or stake 1090 to be secured to the motor unit 1008 for stability. The support pole or stake is commonly found in the decoy market to provide the decoy with stability, height off the ground and/or an anchor to the ground. The motor unit 908 would be adapted to receive and be secured to the support pole.

By employing different cover portions and/or wing attachments, the user can better match the particular bird desired to be hunted or decoyed and can be done quickly and easily on the spot. The cover portion material is preferably made of a bendable plastic, waterproof material or waterproofed material that can withstand outdoor elements. Other materials may be used like wood, foam, composites and the like as long as the material can withstand outdoor elements.

While the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

Having described the invention, we claim:

1. A system for conversion of motorized decoys comprising:
   a decoy body having a head, a tail and one or more first appendages, said head, said tail and said one or more first appendages being associated with a first species of animal to be depicted by the decoy body;
   a motor in the decoy body having one or more motor connectors to engage one or more attachment connectors of said one or more first appendages, said motor driving the one or more first appendages to simulate movement of said one or more first appendages in association with the animal to be depicted by the decoy body and said one or more first appendages having an attachment cover meant to represent a second or third species of animal associated with the attachment cover;
   a first decoy cover that surrounds the decoy body, said first decoy cover having a cover head, a cover middle and a cover tail, said first decoy cover having a decorated outer surface and a non-decorated inner surface and said first decoy cover intended to resemble said second species of animal, said first decoy cover having a first appendage hole, a first edge with fasteners placed along said first edge and a second edge with fasteners placed along said second edge that are capable of being reciprocally attached to the fasteners located along said first edge, said fasteners along said first and second edges securing the first decoy cover on the decoy body and including at least one set of fasteners associated with said cover head, at least two sets of fasteners associated with said cover middle, and at least one set of fasteners associated with said cover tail, and,
   a second decoy cover that surrounds the decoy body, said second decoy cover having a second cover head, a second cover middle and a second cover tail, said second decoy cover having a decorated outer surface and a non-decorated inner surface and said second decoy cover intended to resemble said third species of animal, said third species of animal being a different species than said first or second species of animal and said second decoy cover having a second appendage hole, a third edge with fasteners placed along said third edge and a fourth edge with fasteners placed along said fourth edge that are capable of being reciprocally attached to the fasteners along said third edge, said fasteners along said third and fourth edges securing the second decoy cover on the decoy body and including at least one set of fasteners associated with said second cover head, at least two sets of fasteners associated with said second cover middle, and at least one set of fasteners associated with said second cover tail.

2. The system of claim 1, wherein said first appendage hole in the first decoy cover allows said one or more first appendages to be coupled to the motor through the first decoy cover.

3. The system of claim 1, wherein a second set of appendages can be coupled to the one or more motor connectors to simulate movement.

4. The system of claim 3, wherein said first appendage hole comprises one or more holes in the first decoy cover that allow said one or more first appendages to be coupled to the motor through the first decoy cover.

5. The system of claim 1, wherein the fasteners are buttons.

6. The system of claim 1, wherein the fasteners are clasps.

7. The system of claim 1, wherein the fasteners are hook/loop straps.

8. The system of claim 1, wherein the one or more attachment connectors and said one or more motor connectors are nuts and bolts.

9. The system of claim 1, wherein the one or more attachment connectors and said one or more motor connectors are magnets.

10. The system of claim 1, wherein the one or more attachment connectors and said one or more motor connectors are snaps.

11. A method for conversion of motorized decoys comprising the steps of:
   providing a decoy body having a head, a tail and one or more first appendages, said head, said tail and said one or more first appendages being associated with a first species of animal to be depicted by the decoy;
   providing a motor in the decoy body, said motor having one or more motor connectors to engage one or more attachment connectors of said one or more first appendages, said one or more first appendages capable of being driven with said motor to simulate movement of said one or more first appendages in association with the animal to be depicted by the decoy body and said one or more first appendages having an attachment cover meant to represent a second or third species of animal associated with the attachment cover;
   surrounding the decoy body with a first decoy cover, said first decoy cover having a cover head, a cover middle and a cover tail, said first decoy cover having a decorated outer surface and a non-decorated inner surface, said first decoy cover intended to resemble said second species of animal, said first decoy cover having a first appendage hole, a first edge with fasteners placed along said first edge and a second edge with fasteners placed along said second edge that are capable of being reciprocally attached to the fasteners located along said first edge, said fasteners along said first and second edges securing the first decoy cover on the decoy body and including at least one set of reciprocal fasteners associated with said cover head, at least two sets of reciprocal fasteners associated with said cover middle, and at least one set of reciprocal fasteners associated with said cover tail, and,
   surrounding the decoy body with a second decoy cover, said second decoy cover having a second cover head, a second cover middle and a second cover tail, said second decoy cover having a decorated outer surface and a non-decorated inner surface, said second decoy cover intended to resemble said third species of animal, said third species of animal being a different species than said first or second species of animal and said second decoy cover having a second appendage hole, a third edge with fasteners placed along said third edge and a fourth edge with fasteners placed along said fourth edge that are capable of being reciprocally attached to the fasteners along said third edge, said fasteners along said third and fourth edges securing the second decoy cover on the decoy body and including at least one set of reciprocal fasteners associated with said second cover head, at least two sets of reciprocal fasteners associated with said second cover middle, and at least one set of reciprocal fasteners associated with said second cover tail.

12. The method of claim 11, wherein said first appendage hole in the first decoy cover allows said one or more first appendages to be coupled to the motor through the first decoy cover.

13. The method of claim 11, wherein a second set of appendages can be coupled to the one or more connectors to simulate movement.

14. The method of claim 13, wherein said first appendage hole comprises one or more holes in the first decoy cover that allow said one or more first appendages to be coupled to the motor through the first decoy cover.

15. The method of claim 11, wherein the fasteners are buttons.

16. The method of claim 11, wherein the fasteners are clasps.

17. The method of claim 11, wherein the fasteners are hook/loop straps.

18. The method of claim 11, wherein the one or more attachment connectors and said one or more motor connectors are nuts and bolts.

19. The method of claim 11, wherein the one or more attachment connectors and said one or more motor connectors are magnets.

20. The method of claim 11, wherein the one or more attachment connectors and said one or more motor connectors are snaps.

21. A decoy cover conversion system comprising:
a first decoy cover that surrounds a decoy body, said decoy body having a head, a tail and one or more first appendages, said head, said tail and said one or more first appendages being associated with a first species of animal to be depicted by the decoy body; said first decoy cover having a cover head, a cover middle and a cover tail, said first decoy cover having a decorated outer surface and a non-decorated inner surface, said first decoy cover intended to resemble a second-species of animal and said first decoy cover having a first appendage hole to allow a first edge with fasteners placed along said first edge and a second edge with fasteners placed along said second edge that are capable of being reciprocally attached to the fasteners located along said first edge, said fasteners along said first and second edges securing the first decoy cover on the decoy body and including at least one set of fasteners associated with said cover head, at least one set of reciprocal fasteners associated with said cover middle, and at least one set of reciprocal fasteners associated with said cover tail, and,
a motor in the decoy body having one or more motor connectors to engage one or more attachment connectors of said one or more first appendages, said motor driving the one or more first appendages to simulate movement of said one or more first appendages in association with the animal to be depicted by the decoy body and said one or more first appendages having an attachment cover meant to resemble said second species of animal or a third species of animal associated with the attachment cover; and,
a second decoy cover to surround the decoy body, said decoy body further including; said second decoy cover having, a second cover head, a second cover middle and a second cover tail, said second decoy cover having a decorated outer surface and a non-decorated inner surface, said second decoy cover intended to resemble said third species of animal, said third species of animal being a different species than said first or second species of animal and said second decoy cover having a second appendage hole, a third edge with fasteners placed along said third edge and a fourth edge with fasteners placed along said fourth edge that are capable of being reciprocally attached to the fasteners along said third edge, said fasteners along said third and fourth edges securing the second decoy cover on the decoy body and including at least one set of fasteners associated with said second cover head, at least one set of reciprocal fasteners associated with said second cover middle, and at least one set of reciprocal fasteners associated with said second cover tail.

22. The cover of claim 21, wherein said first appendage hole in the first decoy cover allows said one or more first appendages to be coupled to the motor through the first decoy cover.

23. The cover of claim 21, wherein said one or more second appendages comprise a second set of appendages that can be coupled to the one or more connectors to simulate movement.

24. The cover of claim 23, wherein said first appendage hole comprises one or more holes in the first decoy cover that allow said one or more first appendages to be coupled to the motor through the first decoy cover.

25. The cover of claim 21, wherein the fasteners are buttons.

26. The cover of claim 21, wherein the fasteners are clasps.

27. The cover of claim 21, wherein the fasteners are hook/loop straps.

28. The cover of claim 21, wherein the one or more attachment connectors and said one or more motor connectors are nuts and bolts.

29. The cover of claim 21, wherein the one or more attachment connectors and said one or more motor connectors are magnets.

30. The cover of claim 21, wherein the one or more attachment connectors and said one or more motor connectors are snaps.

* * * * *